US007894018B2

(12) United States Patent
Mitov

(10) Patent No.: US 7,894,018 B2
(45) Date of Patent: Feb. 22, 2011

(54) METHOD FOR PRODUCING A LIQUID CRYSTAL MATERIAL HAVING A BROADENED LIGHT REFLECTION BAND

(75) Inventor: Michel Mitov, Toulouse (FR)

(73) Assignee: Centre National de la Recherche Scientifique (CNRS), Paris (FR)

( * ) Notice: Subject to any disclaimer, the term of this patent is extended or adjusted under 35 U.S.C. 154(b) by 45 days.

(21) Appl. No.: 11/991,720

(22) PCT Filed: Aug. 31, 2006

(86) PCT No.: PCT/EP2006/065895

§ 371 (c)(1),
(2), (4) Date: Mar. 6, 2008

(87) PCT Pub. No.: WO2007/028768

PCT Pub. Date: Mar. 15, 2007

(65) Prior Publication Data

US 2009/0128744 A1 May 21, 2009

(30) Foreign Application Priority Data

Sep. 8, 2005 (FR) .................................. 05 09158

(51) Int. Cl.
*G02F 1/1333* (2006.01)
(52) U.S. Cl. ........................................ 349/88; 349/100
(58) Field of Classification Search ................ 349/88, 349/100–117; 428/1.1
See application file for complete search history.

(56) References Cited

U.S. PATENT DOCUMENTS 5,691,789 A 11/1997 Li et al.

(Continued)

FOREIGN PATENT DOCUMENTS

EP 0 346 911 12/1989

(Continued)

OTHER PUBLICATIONS

Binet, C., et al., "Switchable broadband light reflection in polymer-stabilized cholesteric liquid crystals", Journal of Applied Physics, vol. 90, No. 4, (Aug. 15, 2001), pp. 1730-1734.

(Continued)

*Primary Examiner*—Akm E Ullah
(74) *Attorney, Agent, or Firm*—Blakely, Sokoloff, Taylor & Zafman

(57) ABSTRACT

The invention relates to a method of producing a liquid crystal material that can be addressed by an electric field. The inventive method is characterised in that it comprises the following steps consisting in: forming a liquid crystal mixture having a helical structure comprising a first non-photoreactive liquid crystal and a second photoreactive liquid crystal, said first liquid crystal comprising first chiral liquid crystal molecules and having a positive dielectric anisotropy and said second liquid crystal being in a concentration of less than or equal to 5% of the mixture; applying a first treatment to the liquid crystal mixture, said first treatment being performed at a constant temperature and modifying a pitch of the helix of the mixture; and applying a second treatment to the mixture, such that the second liquid crystal forms a polymer network, said second treatment being performed during all or part of the first treatment such that the liquid crystal material retains a memory of the modifications to the pitch of the helix. The invention also relates to a liquid crystal device comprising a liquid crystal material that is produced using the inventive method.

26 Claims, 1 Drawing Sheet

U.S. PATENT DOCUMENTS

| | | | |
|---|---|---|---|
| 5,940,150 A | | 8/1999 | Faris et al. |
| 5,999,243 A | | 12/1999 | Kameyama et al. |
| 6,010,643 A | | 1/2000 | Coates et al. |
| 6,017,468 A | | 1/2000 | Chung et al. |
| 6,057,008 A | | 5/2000 | Schwalb et al. |
| 6,061,108 A | | 5/2000 | Anderson et al. |
| 6,071,438 A | | 6/2000 | Leigeber et al. |
| 6,099,758 A | | 8/2000 | Verrall et al. |
| 6,217,948 B1 | * | 4/2001 | Verrall et al. ............... 427/492 |
| 6,831,720 B2 | * | 12/2004 | Jiang et al. .................. 349/115 |
| 2002/0041346 A1 | | 4/2002 | Faris et al. |
| 2002/0057400 A1 | | 5/2002 | Li et al. |
| 2002/0150698 A1 | * | 10/2002 | Kawabata ................... 428/1.1 |
| 2003/0098442 A1 | * | 5/2003 | Ichihashi et al. ........ 252/299.01 |
| 2004/0011994 A1 | * | 1/2004 | Yumoto et al. ............ 252/299.5 |
| 2009/0098313 A1 | * | 4/2009 | Mitov et al. .................. 428/1.1 |

FOREIGN PATENT DOCUMENTS

| | | | |
|---|---|---|---|
| EP | 0 982 605 | | 3/2000 |
| EP | 0982605 A 1 | * | 3/2000 |
| EP | 1 249 483 | | 10/2002 |
| EP | 1 295 929 | | 3/2003 |
| FR | 2 781 062 | | 1/2000 |
| GB | 2 326 727 | | 12/1998 |
| GB | 2 355 720 | | 5/2001 |
| WO | WO-94/15785 | | 7/1994 |
| WO | WO-97/16762 | | 5/1997 |
| WO | WO-98/57223 | | 12/1998 |
| WO | WO-99/63400 | | 12/1999 |
| WO | WO-00/60407 | | 10/2000 |
| WO | WO-02/056067 | | 7/2002 |

OTHER PUBLICATIONS

Lavernhe, A., et al., "How to broaden the light reflection band in cholesteric liquid crystals? A new approach based on polymorphism", Liquid Crystals, vol. 28, No. 5, (2001), pp. 803-807.

Mitov, M., et al., "Broadening of light reflection in glassy cholesteric materials and switchable Polymer-Stabilized Cholesteric Liquid Crystals", Liquid Crystals V, Proceedings of SPIE, vol. 4463, (2001), pp. 11-20.

Mitov, M., et al., "Glassy Cholesteric Broadband Reflectors with a Pitch Gradient: Material Design, Optical Properties and Microstructure", Mol. Cryst. and Liq. Cryst., vol. 358, (2001), pp. 209-223.

* cited by examiner

METHOD FOR PRODUCING A LIQUID CRYSTAL MATERIAL HAVING A BROADENED LIGHT REFLECTION BAND

The present patent application is a national phase application of International Application No. PCT/EP2006/065895, filed Aug. 31, 2006.

FIELD OF THE INVENTION

This invention relates to the field of liquid crystals, and more particularly liquid crystal materials adapted for reflect incident light.

STATE OF THE ART

Today, liquid crystal based materials are increasingly used because of their optical properties which enable them to control visible and invisible (infrared IR and ultraviolet UV) light waves.

In particular, cholesteric liquid crystal based materials have been developed, because they have optical properties that differ from those of nematic liquid crystals due to their helical structure. This helical structure enables cholesteric liquid crystal to selectively reflect light with an associated wavelength $\lambda_R$ related to the pitch p of the helical structure by the relationship (in normal incidence):

$$\lambda_R = n \cdot p$$

where n is the mean refractive index of the cholesteric liquid crystal ($n=(n_e+n_o)/2$ where $n_e$ and $n_o$ are the extraordinary and ordinary optical indices). The reflection bandwidth $\Delta\lambda$ is related to $\lambda_R$, to n and to the birefringence $\Delta n=n_e-n_o$ by the relationship:

$$\Delta\lambda = \lambda_R \cdot \Delta n/n$$

Since $(\Delta n)_{max}$ is of the order of 0.3 for common organic compounds, $\Delta\lambda$ is usually limited to the visible range below 100 nm and is typically equal to 50 nm. Thus, only a limited fraction of the rays can be reflected by a conventional cholesteric liquid crystal.

Even though, for certain applications, reflective selectivity is required in cholesteric liquid crystals, many applications exist for which such selectivity is a disadvantage.

This is because, in order to effectively change the energy (light, heat) crossing a window composed of a liquid crystal material for example, the material must be able to reflect a wide range of wavelengths. This makes it possible to improve the heat balance of certain closed spaces, such as in buildings or means of transport, and so save energy (for example by removing the need for air-conditioning).

As well as the area of so-called smart windows, liquid crystal materials having broad, unusual, reflective properties, also have applications in many other sectors such as telecommunications (photonic reflecting materials), optics (anti-glare eyewear), heating (IR reflecting coatings), military (IR stealth), and displays (black on white reflecting display without polariser).

Pioneering work by the Philips group has made it possible to produce solid cholesteric liquid crystal materials that reflect light over a broader band of wavelengths, of the order of 300 nm (cf. D. J. Broer, J. Lub and G. N. Mol, *Nature* 378, 467 [1995]). This increase is a result of the structure of the cholesteric liquid crystal material, which has a helicity that depends on the pitch gradient.

One aim of the present invention is to provide an alternative method of producing a liquid crystal material having broader ranging reflecting properties.

PRESENTATION OF THE INVENTION

To this end, the invention describes a method of producing a liquid crystal material that can be addressed by an electric field, characterised in that it comprises the steps of:

Forming a liquid crystal mixture with a helical structure comprising a first non-photoreactive liquid crystal (A) and a second photoreactive liquid crystal (B), the first liquid crystal (A) comprising first chiral liquid crystal molecules (A1) and the first liquid crystal (A) having a positive dielectric anisotropy, and the second liquid crystal (B) being in a concentration of less than or equal to 5% of the mixture;

Applying a first treatment to the liquid crystal mixture, the first treatment being carried out at constant temperature and modifying a pitch of the helix of the mixture;

Applying a second treatment to the mixture such that the second liquid crystal (B) forms a polymer network, the second treatment being performed during all or part of the duration of the first treatment such that the liquid crystal material retains a memory of the modifications to the pitch of the helix.

Preferred but not limiting aspects of the method of producing the liquid crystal material of the invention are as follows:

the mixture presents a polymorphism comprising at least a cholesteric phase and/or a smectic C chiral phase;

the first liquid crystal (A) can change the sign of dielectric anisotropy depending on the frequency, in which case it further comprises second liquid crystal molecules (A2);

the second liquid crystal (B) is adapted for being activated by UV irradiation;

the mixture further comprises a photoinitiator agent (C) to enhance the formation of the polymer network under UV irradiation;

the mixture further comprises a dispersal agent (D) to enhance the dispersion of the components of the mixture and modify one dynamic of the liquid crystal material during electrical addressing;

the mixture further comprises a thermal polymerisation inhibitor (E);

the mixture further comprises an absorbing agent (F) for absorbing UV radiation so that the liquid crystal material acquires a structure and/or function gradient;

the second treatment is UV irradiation adapted for polymerising the mixture, performed preferably with UV radiation having a wavelength of 365 nm and a power of 0.1 mW/cm², for an exposure time comprised between 30 and 60 minutes; this allows the mixture to cross-link or gelate;

the second treatment can be a quenching adapted for vitrifying the mixture;

the first treatment can consist in applying to the mixture an electric field having, for example, a frequency of 1 kHz and varying from 0.5 to 20 V/μm;

the first treatment can consist in applying to the mixture a magnetic field varying, for example, from 2 to 15 kG;

the first treatment can consist in applying mechanical pressure to the mixture;

the first treatment can be an electromagnetic irradiation, in which case the first liquid crystal further comprises third liquid crystal molecules (A3) in order for the first treatment to modify the molecular conformation of the mixture;

this electromagnetic irradiation can be performed by UV radiation having a wavelength comprised between 250 and 365 nm, an energy comprised between 1 and 100 mJ/cm$^2$, and for an exposure time comprised between 1 and 3600 seconds, preferably between 60 and 600 seconds;

this electromagnetic irradiation can be performed by visible radiation having a wavelength of over 435 nm, an energy comprised between 1 and 100 mJ/cm$^2$, and for an exposure time comprised between 1 and 3600 seconds, preferably between 60 and 600 seconds;

applying any one of the treatments, the mixture is introduced into a capacitive cell comprising two substrates covered with a conducting film.

A liquid crystal device is also proposed comprising a substrate on which is placed a liquid crystal material produced in accordance with the inventive method. This liquid crystal device can further comprise another substrate covering the liquid crystal material, so as to form a capacitive cell.

DESCRIPTION OF THE DRAWINGS

Other characteristics and advantages of the invention will become evident in the following description, which is purely by way of illustration and not limiting and which should be read in the light of the attached drawings, wherein.

DETAILED DESCRIPTION OF THE INVENTION

Figure 1:
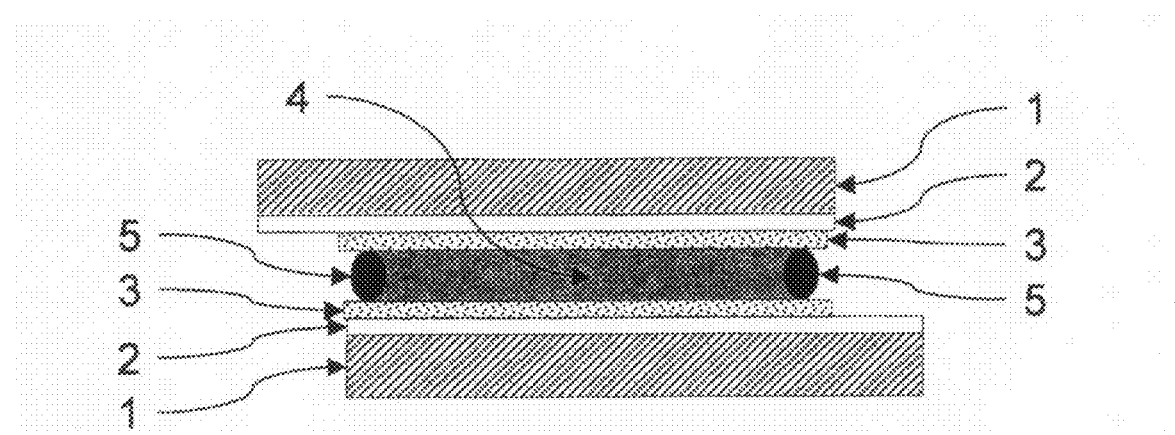
FIG. 1 is a diagrammatic representation of a cell containing the liquid crystal material according to the invention.

Since a cholesteric liquid crystal is a chiral nematic type liquid crystal, its component liquid crystal molecules form a helical structure h with a pitch p. As explained above, this helical organisation enables a cholesteric liquid crystal to reflect light selectively (Bragg reflections) with an associated wavelength $\lambda_R$ that depends on the pitch p of the helical structure and on the mean refractive index n.

The liquid crystal material according to the invention is produced in such a way that it is adapted for reflecting light over a broad band of wavelengths.

The starting medium for producing this liquid crystal material is a mixture that has a helical structure because of its composition.

In fact this mixture comprises a first non-photoreactive liquid crystal (A) and a second photoreactive liquid crystal (B). In general, a first chiral liquid crystal (A) will be taken. However, in the case in which the first liquid crystal (A) is not chiral, a second chiral liquid crystal (B) will be chosen, in order for the mixture of the first and second liquid crystals (A and B) to confer a helical structure to the mixture.

The first non-photoreactive liquid crystal (A), which may have a low molar mass or may be a polymer, may consist of identical molecules or a mixture of several molecules. This first liquid crystal (A) may be selected from the family of cyanobiphenyls or cyanoterphenyls and related esters.

A fraction of the first liquid crystal (A) may contain for example the compounds E7, BL001, E44 or E63 from Merck Ltd. or ROTN-570, TNO623 or TN10427 from Hoffman-La Roche.

Further, the first liquid crystal (A) comprises, wholly or partly, chiral liquid crystal molecules (A1). Due to these chiral molecules, the mixture shows polymorphism which comprises of at least a cholesteric phase (also called chiral nematic) and/or a chiral smectic C phase. These liquid crystal molecules (A1) are generally selected non-photoreactive.

These first molecules (A1) may be selected for example from the family of cyanobiphenyls or cyanoterphenyls and related esters. Notably, it is possible to select a compound from the Licrilite™ (Merck Ltd.) family such as BL094 or BL095 or from the following compounds: C15, CB15, ZLI-4571, ZLI-4572 (Merck Ltd.)

The first liquid crystal (A) has a positive dielectric anisotropy. It may be a liquid crystal known as dual, that is, one that changes the sign of dielectric anisotropy depending on the frequency, if it also comprises particular second liquid crystal molecules (A2).

These second liquid crystal molecules (A2) may be selected, for example, from the following compounds:

2F-3333 (Rolic Research Ltd.);

4-pentylphenyl 2-chloro-4-(4-pentyl-benzoyloxy)benzoate or 4-octylphenyl 2-chloro-4-(4-heptylbenzoyloxy)benzoate (Acros Organics N. V.)

The mixture further comprises a second photoreactive liquid crystal (B), so as to make the mixture photosensitive. The second liquid crystal (B) is adapted for being activated by UV radiation. Preferably, this second liquid crystal (B) contains more than one functional group, typically acrylate or methacrylate.

The concentration of the second liquid crystal (B) in the mixture may vary from 3 to 100%.

When the concentration of the second liquid crystal (B) is low, typically below 5%, the liquid crystal material will, after treatment, be able to be addressed by an electric field, that is to say that it is possible to vary the optical properties depending on the electric field applied.

When the concentration of the second liquid crystal (B) is high, that is over 50%, but typically between 80 and 100%, the final liquid crystal material will be a cross-linked polymer. In this case, the liquid crystal material may form a film that is semi-free (remaining on a rigid or flexible substrate) or free (without substrate).

The second liquid crystal (B) is selected for example from the following compounds:

RM257, RM82 (Merck Ltd.);

BAB, BAB-6, BABB-6, BMBB-6 (L.-C. Chien, Recent Advances in Liquid Crystal Polymers, American Chemical Society Book Series, 1995);

photo-cross-linkable polyorganosiloxane oligomers such as CLM012CN, CC4039, CC390, CC670, CC680, CC1500 (Wacker Chemie Ltd.; EP0711780B1; U.S. Pat. No. 5,641,850A).

Preferably, the mixture further comprises a photoinitiator (C) directed to activating the transformation of the second liquid crystal (B) after UV irradiation for example. The concentration of the photoinitiator (C) may vary between 0.5 and 5.0% of the component (B).

The component (C) may be selected from the following compounds:

Irgacure 907, Irgacure 651, Darocur 1173 (Ciba-Geigy);

2,6-di-terbutyl-4-methylphenol (Sigma-Aldrich).

This mixture may further comprise a dispersal agent (D). This dispersal agent (D), present at between 1 and 30% of the mixture, is directed to enhancing the dispersion of the species in the mixture. When the liquid crystal material is able to be addressed by an electric field, it also makes it possible to influence the dynamic during molecular reorientation.

The dispersal agent (D) may be selected for example from the following compounds:

Disperbyk-160 series (BYK Chemie Ltd.);
Disperon #703 (Kusumoto Kasei Ltd.);
24000 (ICI Ltd.).

The mixture may further comprise a thermal polymerisation inhibitor (E). This thermal polymerisation inhibitor (E) is directed to preventing thermal polymerisation of the second liquid crystal (B) particularly. This compound is added in proportions comprised between 0.001 and 5% of compound (B); preferably its concentration is comprised between 0.001 and 1% of compound (B).

This thermal polymerisation inhibitor (E) is selected for example from the following compounds: hydroquinone, 2-hydroxybenzophenone or 4-methoxy-2-hydroxybenzophenone (Sigma-Aldrich).

The mixture may further comprise an absorbing agent (F) directed to absorbing the UV radiation in order to create materials with a structure and/or function gradient. This absorbing agent (F) typically forms between 0.5 and 2% of the mixture.

The absorbing agent (F) is selected for example in the series of Tinuvin (Ciba-Geigy) such as Tinuvin 1130.

These different components are mixed homogeneously by temperature mixing. In a preferred embodiment, a mixing temperature is selected that is higher than the clarification temperature of each of the compounds.

Another way of producing the mixture consists in placing the different compounds in a capped glass tube and subjecting this glass tube to ultrasounds, with or without heating.

The mixture may be introduced by capillarity into a capacitive cell produced according to the diagram in FIG. 1.

Such a capacitive cell comprises two glass or plastic substrates 1, each of these substrates 1 being covered by a conducting film 2, made of ITO (Indium Tin Oxide) for example, and by a polyimide or polyvinyl alcohol (PVA) surfactant film 3.

The two sets formed in this way are kept apart at a distance of between 1 and 500 μm, preferably between 10 and 20 μm, by the presence of two spacers 5. The spacer 5 may be for example beads, or polymer fibres, or a plastic film with a calibrated thickness.

The mixture of liquid crystals 4 described above is then introduced into the space formed thus.

The steps of preparing the photosensitive mixture and introducing it into the capacitive cell are preferably carried out in the dark.

As indicated above, when the concentration of the second liquid crystal (B) is over 50%, the liquid crystal material may form a film that is semi-free (remaining on a rigid or flexible substrate) or free (without substrate).

Once the mixture has been made (and either placed on a substrate or in a capacitive cell, or not), it must be treated so that the resulting liquid crystal material has greater, unusual, optical performance and properties, notably a broader wavelength reflection bandwidth.

Such a transformation of the optical properties of the mixture is carried out by applying two treatments, totally or partly simultaneously.

The first treatment is directed to modifying the pitch of the helix characteristic of the mixture with a helical structure.

Preferably, the first treatment is carried out at constant temperature in order to prevent any modifications to physical parameters intrinsic to the mixture, caused by temperature variations.

The aim of the second treatment is to give the liquid crystal material a memory of the modifications to the pitch of the helix caused by the first treatment.

The second treatment may be for example UV irradiation performed during the change of pitch of the helix resulting from the first treatment. The UV irradiation used consists in UV radiation with a wavelength typically of the order of 365 nm, and a power of 0.1 mW/cm$^2$, with a typical exposure time comprised between 30 and 60 minutes.

Because of this production method, and particularly the second treatment, a polymer network forms in the whole volume of the liquid crystal. The orientational properties of the liquid crystal are strongly influenced by the nature of the polymer network: distribution, homogeneity, symmetry, etc.

As a result of this production method, and particularly because the first and second treatments are carried out at least partly simultaneously, the polymer network formed gives the liquid crystal material a memory of the modifications to the helix pitch that occur during the first treatment. Since the bandwidth of the light reflecting wavelength depends on the helical pitch, the material has a broader bandwidth than conventional material, for example in the middle of the visible spectrum from 100 to several hundred nanometres compared with fifty or so nanometres.

Figure 2:
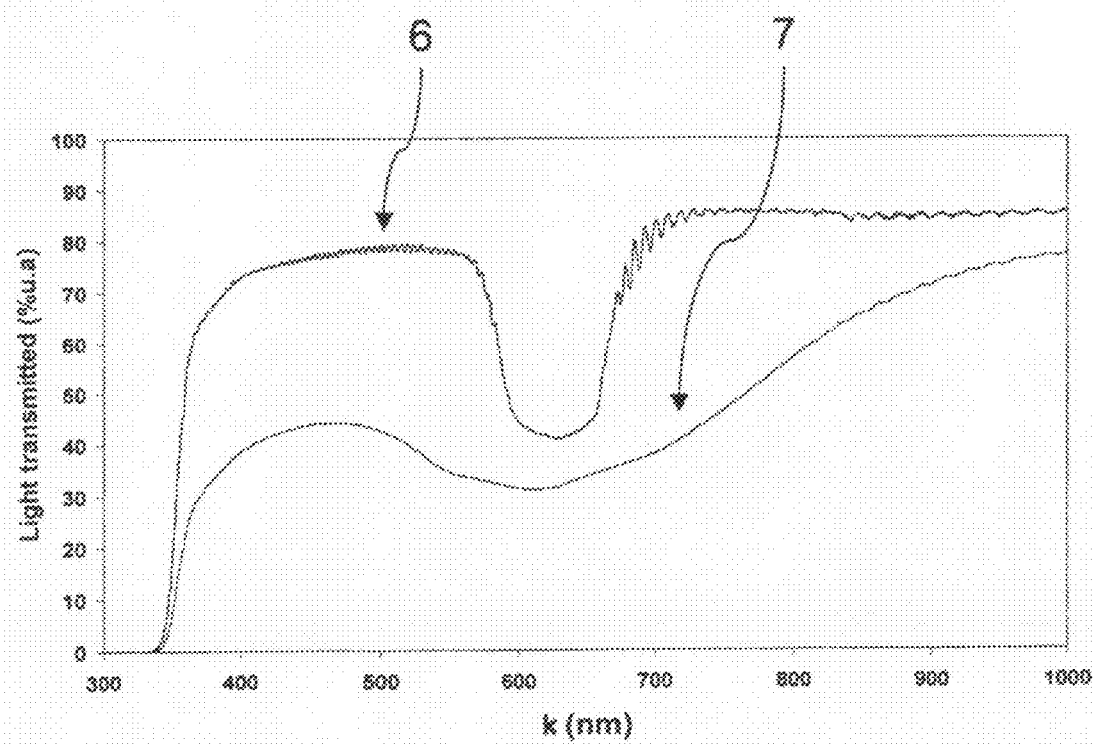
FIG. 2 is a graph showing the modification in the light spectrum transmitted by a liquid crystal material produced according to the invention.

FIG. 2, which shows the percentage of light transmitted depending on the wavelength of the light, allows a comparison for a particular example of the wavelength reflection bandwidth of a liquid crystal material that has not been subjected to either of the two treatments (line 6) and a liquid crystal material having been produced following the method of the invention (line 7). It is apparent on line 6 that, in the absence of treatment, the reflection bandwidth is about 85 nm, centred on a mean wavelength of 620 nm, whereas after treatment, the reflection bandwidth, still centred on a mean wavelength of 620 nm, is about 300 nm.

The broadening of the reflection bandwidth obtained depends on the amplitude of the pitch variation as a function of the reaction control parameter; the greater the amplitude, the broader the reflection bandwidth.

The first treatment directed to changing the pitch of the helix may consist in applying an electric field. For example, an electric field with a frequency of 1 kHz, and varying from 0.5 to 20 V/μm may be applied.

It is also possible to vary the pitch of the helix by applying a magnetic field varying for example from 2 to 15 kG (from 0.2 to 1.5 T).

Another solution for changing the pitch of the helix consists in applying mechanical pressure on the capacitive cell.

The first treatment directed to changing the pitch of the helix defining the structure of the mixture may be performed by modifying the molecular conformation of the structure induced by electromagnetic radiation, where this electromagnetic radiation may be visible or UV radiation.

To this end, the first liquid crystal (A) of the mixture comprises third liquid crystal molecules (A3) that make up between 0.1 and 10% of the mixture, these third molecules being chosen from the following compounds:

family of azobenzenes or azoxybenzenes (Kurihara et al., Chem. Mater., 13, 1992, 2001; Kusumoto et al., Mol. Cryst. Liq. Cryst., 14, 727, 1993; Negishi et al., Chem. Lett., 319, 1996 et 583, 1996; Bobrovsky et al., Adv. Mater., 12, 1180-3, 2000; Kitaeva et al., Mol. Cryst. Liq. Cryst., 2, 261-279, 1992) including 4,4'-dialkylazobenzenes (Moriyama et al., J. Mater. Chem., 11, 1003-1010, 2001);

fulgide family (Yokoyama et al., Chem. Lett., 687, 1997) including indole fulgide (Janicki et al., J. Am. Chem.

Soc., 117, 8524, 1995), bisnaphthol-based chiral fulgide derivatives (Yokoyama et al., Chem. Lett., 687, 1997);

diarylethene family (Uchida et al., Chem. Lett., 654, 2000; Yamaguchi et al., Chem. Mater., 12, 869, 2000) including diarylethylene-bis imine (Denekamp et al., Adv. Mater., 10, 1081, 1998);

family of overcrowded alkenes (Fering a et al., J. Am. Chem. Soc., 117, 9929, 1995; Huck et al., Science, 273, 1686, 1996).

In this case, a trans-cis photoisomerisation or a photocyclisation will occur for example, from the effect of UV radiation with a wavelength comprised between 250 and 365 nm.

The reverse change will occur from the action of visible radiation with a wavelength greater than or equal to 435 nm.

Electromagnetic irradiation is applied with radiation having energy typically comprised between 1 and 100 mJ/cm$^2$ and irradiation times that may vary from several seconds to several dozen minutes (between 1 and 3600 seconds), typically of the order of several minutes (that is between 60 and 600 seconds).

The liquid crystal material resulting from the formation of a polymer network concurrently with modifications of the pitch of the helix defining the structure of the initial mixture makes it possible to reflect light over a broader band of wavelengths, typically, in the visible spectrum, of the order of several hundred nanometres (between 100 and 500 nanometres).

When the material comprises less than 5% of polymer network, the light reflection property may be modified by applying an alternating electric field with a typical frequency of the order of 1 kHz. This is the case for example when the photoreactive liquid crystal (B) of the mixture is in a low concentration, typically under 5%.

In this case, the liquid crystal material can be addressed. The optical cell passes gradually from a reflecting state to a diffusing state (typically from 1 V/μm) then becomes transparent (typically from 10 V/μm).

The reader will have understood that many modifications may be applied without materially departing from the new methods and advantaged described here. Therefore, all modifications of this type are directed to being incorporated within the scope of the method for producing a liquid crystal material according to the invention, and the liquid crystal device comprising such a liquid crystal material.

The invention claimed is:

1. A method for producing a liquid crystal material that can be addressed by an electric field, characterised in that it comprises the steps of:

Forming a liquid crystal mixture with a helical structure comprising a first non-photoreactive liquid crystal (A) and a second photoreactive liquid crystal (B), the first liquid crystal (A) comprising first chiral liquid crystal molecules (A1) and the first liquid crystal (A) having a positive dielectric anisotropy, and the second liquid crystal (B) being in a concentration of less than or equal to 5% of the mixture;

Applying a first treatment to the liquid crystal mixture, the first treatment being carried out at constant temperature and modifying a pitch of the helix of the mixture without modifying a handedness of the helix;

Applying a second treatment to the mixture such that the second liquid crystal (B) forms a polymer network, the second treatment being performed during all or part of the first treatment such that the liquid crystal material keeps a memory of the modifications to the pitch of the helix.

2. The method of claim 1, characterised in that the mixture presents a polymorphism comprising at least a cholesteric phase and/or a smectic C chiral phase.

3. The method of claim 1, characterised in that the first liquid crystal (A) further comprises second liquid crystal molecules (A2) so that it is adapted for changing sign of dielectric anisotropy depending on the frequency.

4. The method of claim 1, characterised in that the second liquid crystal (B) is adapted for being activated by UV irradiation.

5. The method of claim 1, characterised in that the mixture further comprises a photoinitiator agent (C) to enhance the formation of the polymer network in UV irradiation.

6. The method of claim 1, characterised in that the mixture further comprises a dispersal agent (D) to enhance a dispersion of the components of the mixture and modify a dynamic of the liquid crystal material during electrical addressing.

7. The method of clai characterised in that the mixture further comprises a thermal polymerisation inhibitor (E).

8. The method of claim 1, characterised in that the mixture further comprises an absorbing agent (F) adapted for absorbing UV radiation so that the liquid crystal material has a structure and/or function gradient.

9. The method of claim 1, characterised in that the second treatment is UV irradiation adapted for polymerising the mixture.

10. The method of claim 9, characterised in that the UV irradiation is performed with UV radiation having a wavelength of the order of 365 nm and a power of 0.1 mW/cm$^2$, for an exposure time comprised between 30 and 60 minutes.

11. The method of claim 9, characterised in that the second treatment enables cross-linking of the mixture.

12. The method claim 9, characterised in that the second treatment enables gelation of the mixture.

13. The method of claim 1, characterised in that the second treatment is a quenching adapted for vitrifying the mixture.

14. The method of claim 1, characterised in that the first treatment consists in applying an electric field to the mixture.

15. The method of claim 14, characterised in that the electric field has a frequency of 1 kHz and varies from 0.5 to 20 V/μm.

16. The method of claim 1, characterised in that the first treatment consists in applying a magnetic field to the mixture.

17. The method of claim 16, characterised in that the magnetic field varies from 2 to 15 kG.

18. The method of claim , characterised in that the first treatment consists in applying a mechanical pressure to the mixture.

19. The method of claim 1, characterised in that the first treatment is an electromagnetic irradiation, and the first liquid crystal further comprises third liquid crystal molecules (A3) in order for the first treatment to modify the molecular conformation of the mixture.

20. The method of claim 19, characterised in that the electromagnetic irradiation is performed by UV radiation having a wavelength comprised between 250 and 365 nm, an energy comprised between 1 and 100 mJ/cm$^2$, and for an exposure time comprised between 1 and 3600 seconds.

21. The method of claim 20, characterised in that the exposure time is comprised between 60 and 600 seconds.

22. The method of claim 19, characterised in that the electromagnetic irradiation is performed by visible radiation having a wavelength of over 435 nm, an energy comprised between 1 and 100 mJ/cm$^2$, and for an exposure time comprised between 1 and 3600 seconds.

23. The method of claim 22, characterised in that the exposure time is comprised between 60 and 600 seconds.

24. The method of claim 1, characterised in that, before applying any one of the treatments, the mixture is introduced into a capacitive cell comprising two substrates (1) covered with a conducting film (2).

25. A liquid crystal device comprising a substrate (1) on which is placed a liquid crystal material (4) produced in accordance with the method of claim 1.

26. The liquid crystal device of claim 25, characterised in that it further comprises another substrate (1) covering the liquid crystal material (4), so as to form a capacitive cell.

\* \* \* \* \*

UNITED STATES PATENT AND TRADEMARK OFFICE
CERTIFICATE OF CORRECTION

PATENT NO. : 7,894,018 B2  
APPLICATION NO. : 11/991720  
DATED : February 22, 2011  
INVENTOR(S) : Michel Mitov Page 1 of 1

It is certified that error appears in the above-identified patent and that said Letters Patent is hereby corrected as shown below:

In the Claims, Column 8, Claim 7, line 20, please delete "clai" and insert -- claim 1 --.

Column 8, Claim 18, line 52, please delete "claim" and insert -- claim 1 --.

Signed and Sealed this
Second Day of August, 2011

David J. Kappos
*Director of the United States Patent and Trademark Office*